US006704798B1

(12) United States Patent
Mogul

(10) Patent No.: US 6,704,798 B1
(45) Date of Patent: Mar. 9, 2004

(54) EXPLICIT SERVER CONTROL OF TRANSCODING REPRESENTATION CONVERSION AT A PROXY OR CLIENT LOCATION

(75) Inventor: Jeffrey Clifford Mogul, Menlo Park, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/500,058

(22) Filed: Feb. 8, 2000

(51) Int. Cl.$^7$ ................................................ G06F 15/16
(52) U.S. Cl. ...................... 709/246; 709/203; 709/218; 709/219; 709/245; 379/88.14; 348/33
(58) Field of Search ................................ 709/203, 217, 709/218, 219, 225, 229, 231, 232, 246, 247; 455/414.4, 432.2, 600, 744, 3.2, 3.3; 379/88.14, 93.15, 100.13, 142.13; 348/33, 34, 441, 443, 445

(56) References Cited

U.S. PATENT DOCUMENTS 6,006,260 A * 12/1999 Barrick, Jr. et al. ........ 709/224
6,185,625 B1 * 2/2001 Tso et al. .................... 709/247

OTHER PUBLICATIONS

WML Language Reference, Chapter 2: Elements and Attributes, printed from http://developer.openwave.com/htmldoc/32w/wmlref/taglist.html Sep. 10, 2003, pp. 1–37.*
HTTP Working Group, INTERNET–DRAFT, Fielding et. al. Hypertext Transfer Protocol HTTP/1.1 Draft, Jul. 1996, pp. 1–109.*

W3C (1992) Object Meta Information, May 1994, pp. 1–7.*
An active transcoding proxy to support mobile web access, Bharadvaj, H.; Joshi, A.; Auephanwiriyakul, S., Reliable Distributed Systems, 7TH IEEE Symposium, ISBN: 0–8186–9218–9, Oct. 1998, pp. 118–123.*
Content Adaptation Framework: Bringing the Internet to Information Appliances, Mohan, R.; Smith, J.R.; Li, C.; Global Telecommunications Conference, Globecom 99, Dec. 1999, ISBN: 0–7803–5796–5, pp. 2015–2021.*
The Active Cache Protocol by Pei Cao, Jul. 22, 1998.
On Active Networking and Congestion by Samrat Bhattacharjee, Kenneth L. Calvert and Ellen W. Zegura, Technical Report GIT–CC–96/02, College of Computing, Georgia Institute of Technology, 1996 (pp. 1–23).
A Survey of Active Network Research, David L. Tennenhouse, Jonathan M. Smith, W. David Sincoskie, David J. Wetherall and Gary J. Minden, IEEE Communication Magazine, vol. 35, No. 1, pp. 80–86, Jan. 1997 (pp. 1–14).
Media Gateway (MeGa) Architecture Homepage, Feb. 3, 1998, www.cs.berkeley.edu/~elan/mega. pp. 1–5.

* cited by examiner

Primary Examiner—Marc D Thompson
Assistant Examiner—Beatriz Prieto

(57) ABSTRACT

Information returned by a server to a client includes instructions, executable by either a proxy server or the client, for converting the returned information from a first representation to a second representation. The representation conversion may be made by a proxy server, for example, to make transmission of the returned information to the client more efficient, and/or to render the returned information in a format suitable for display by the client. By having the server embed representation conversion information in the query response, the representation conversion can take into account the type and other characteristics of information being returned, as well as the computational and display characteristics of the client.

19 Claims, 6 Drawing Sheets

EXPLICIT SERVER CONTROL OF TRANSCODING REPRESENTATION CONVERSION AT A PROXY OR CLIENT LOCATION

The present invention relates to the field of system networks, and, more particularly, to methods and systems for converting data transmitted across a network from a first representation to a second representation.

BACKGROUND OF THE INVENTION

Hypertext Transfer Protocol (HTTP) is a network protocol used to deliver most resources on the so-called "World Wide Web." A resource is a chunk of information that can be identified by a universal resource locator (URL). The most common kind of resource is a file, but a resource can also be a dynamically-generated query result, the output of a CGI script, as well as various other types of data structures.

When a HTTP client opens a connection and sends a request message to an HTTP server, the server usually returns a response containing the resource that was requested. The format of the request and the response are generally similar. Both kinds of messages typically include an initial line, zero or more header lines, a blank line, and an optional message body. The initial line, called the status line, provides the HTTP version, a computer readable status code and a human readable phrase describing the status code. The header lines provide information about the data sent in the message body. If a HTTP response includes the resource that was requested in the response's message body, there are usually header lines in the response that describe the body.

A client may be connected to a server directly or through one or more intermediaries. For example, a client may choose to use one or more HTTP proxy servers as intermediaries. A proxy server is a relay computer system that is located somewhere on a network path between a server and client computers. A proxy server receives requests from clients, and forwards those requests to the intended servers. Any response from the servers also passes back through the proxy server then to clients. A proxy server thus performs functions of both a client and a server. Often, proxy servers have high bandwidth connections to servers and low bandwidth connections to clients. Thus, part of a proxy server's duties may be to convert a high-resolution response from the server to a low-resolution response for the client so that the response can be more efficiently transferred to and displayed at the client. A client may explicitly specify to the proxy server its preference to receive high or low resolution responses. For details, see the explanation provided in the article entitled "Adapting to Network and Client Variation Using Active Proxies: Lessons and Perspectives," by Armando Fox, Steven D. Gribble, Yatin Chawathe, and Eric A. Brewer, Special issue of IEEE Personal Communications on Adaption, August 1998, which is hereby incorporated by reference as background information. If a client is directly connected to servers (i.e., without using proxy servers), the client may convert a response from a high resolution representation to a low resolution representation in order to display the response on a low resolution display.

Clients vary along many axes, including screen size, color depth, effective bandwidth, processing power, and ability to handle specific data encodings, e.g., GIF PostScript, or MPEG. A typical server response may include text, graphic images, audio data, video data or other multimedia contents. When converting a response, the proxy server or client has many options. For example, if a response includes graphic images, the size and resolution of the image may be reduced. In addition, the number of colors and me spatial frequencies of the image may also be reduced. If a response includes a plurality of graphic images, the order in which the images are sent to a client can be rearranged. If a response includes audio data, the audio data can be compressed or sampled at a lower rate. If a response includes video data, the frame rate may be reduced. Furthermore, large pages can be partitioned into multiple connected sub-pages.

Some existing systems attempt to convert server responses from one representation to another representation that is more suitable for transmission to and displaying at client computers. Representation conversion is sometimes referred to as "transcoding" or "distillation." It is known in the art that transcoding is distinct from "compression." Transcoding is typically lossy while compression may or may not be lossy. Lossy conversions often cause data degradation, and so a transcoding system should strike a balance between the amount of degradation and the decrease in the size of the representation.

In one type of existing system, where a client communicates with an origin server (the original source of the content) via a proxy server, the proxy server has a limited set of page conversion procedures that it applies to convert any received responses. Since the proxy server has a finite set of page conversion procedures for all incoming web pages, these page conversion procedures may be inadequate for conversion of some responses. Examples of such systems include the TranSend service of the GloMop (Global Mobile Computing by Proxy) project and the MeGA (the Media Gateway Architecture).

In another type of existing system, servers may provide instance-specific instructions to proxy servers or clients. An example of this type of existing system is described in the following article which is hereby incorporated by reference as background information: A Survey of active Network Research, David L. Tennenhouse, Jonathan M. Smith, W. David Sincoskie, David J. Wetherall, and Gary J. Minden; IEEE Communications Magazine, Vol. 35, No. 1, pp 80–86. January 1997. Although servers in the systems described in this article do provide some instance-specific instructions, these instructions are primarily provided at the data packet level, which is the lowest level of the network. Namely, these instructions are applicable per data packet (which constitutes portions of a response) transferred across the network, but do not apply to the requested response as a whole. In addition, the instructions are implemented by switches or routers within the network; thus, utilizing this type of system can exacerbate transmission congestion across the network.

Another type of existing system is described in the following article, which is hereby incorporated by reference as background information: *On Active Networking and Congestion, Technical Report* GIT-CC-96-02, Samrat Bhattacharjee, Kenneth L. Calvert and Ellen W. Zegura; College of Computing, Georgia Tech. 1996. The system described in this referenced article preferentially drops low-priority data packets in a data stream. Some data packets are dropped when a network becomes congested. One major disadvantage of this type of systems is the likelihood that valuable data packets may be dropped. Priority policies are implemented at the data packet level by switches or routers; thus, this type of systems increases the work load of switches and routers and could increase network congestion.

Another type of existing system converts web contents to formats displayable on low-resolution screens. An example of this type of system is WebTV. WebTV allows users to browse web sites by using a standard TV screen as the display. Since television screens typically have lower resolution than most computer monitors (also called computer screens), WebTV converts various types of web content to formats suitable for display on television screens. Typically, this type of system uses a generic conversion procedure to convert all web pages to "television pages," without regard to the content of the page(s) being converted. Thus, the same conversion procedure is used to convert photographs, texts, graphic charts of data, and so on. Thus, the format conversion performed by such system is neither instance-specific nor content-specific.

Another type of existing system, described in U.S. patent application Ser. No. 09/048,652, entitled "Method for Dynamically Adapting Web Content and Presentation to Network Conditions," filed by Jeffrey Mogul and Lawrence Brakmo on Mar. 16, 1998, which issued as U.S. Pat. No. 6,243,761 on Jun. 5, 2001. This application is hereby incorporated by reference as background information. In the system as described in the referenced application, the origin server has the burden of adapting content for a particular client. There are several disadvantages to this system. First, in many information distribution systems the origin server is not set up to receive and retain information about each particular client's display capabilities, often because doing so would be expensive and impractical. Second, the origin server may not have enough resources to perform all the necessary representation conversions for a large number of clients having different display capabilities.

In summary, there remains a need for an information distribution system that is configured to handle a variety of representation conversions that take into account both the display capabilities of client devices as well as the content of the images or other data being converted.

SUMMARY OF THE INVENTION

This invention provides methods and systems for converting data from a first representation to a second representation in a network environment. An exemplary method includes the steps of receiving from a server a response to a request, the request having been sent by at least one client to the server; retrieving a representation conversion program, the representation conversion program having been specified in the response; and applying the representation conversion program to convert the response from a first representation thereof to a second representation thereof. In one embodiment, the exemplary method also includes the step of sending the converted response to at least one client. In another embodiment, the step of receiving a response occurs substantially concurrently with the step of retrieving a representation conversion program. In an exemplary embodiment, the representation conversion program is specified in a header portion of the response from the server. In an exemplary embodiment, the step of retrieving a representation conversion program includes retrieving the program from a local cache in the proxy server or the client computer. In another exemplary embodiment, the step of retrieving a representation conversion program includes downloading the program from a location remote from the proxy server or the client computer. Examples of the representation conversion program include applets written in a Java language and programs written in a TCL language. Typically, the converted (second) representation requires less network bandwidth to transfer within the network environment than the first representation. Alternately, the second representation might be more suitable for the client's use than the original representation. For example, the only type of video data usable by the client system might PAL video data, while the server may generate NTSC video data. The transcoding in this example would convert NTSC video data to PAL video data, which is not intended to change the size of the data, but rather removes the burden of conversion from a client system that might not have the ability to perform the conversion.

The exemplary method of the present invention may be performed by a proxy server, a client computer or any other suitable device.

Another exemplary method for converting data from a first representation to a second representation in a network environment includes the steps of receiving a request from at least one client; specifying a representation conversion program in a response to the request; and sending the response to a destination. The specified representation conversion program can be used by a computer at the destination to convert the response from a first representation thereof to a second representation thereof. In an exemplary embodiment, the response includes data having an associated content type. In this embodiment, the step of specifying a representation conversion program includes selecting one of a set of representation conversion programs based on the content type.

Yet another exemplary method for converting data representation in a network environment includes the steps of receiving a request from at least one client; specifying at least one directive statement in a response to the request; and sending the response to a destination. The response can be converted by a computer at the destination from a first representation thereof to a second representation thereof in accordance with the at least one directive statement.

Another exemplary method for converting data representation in a network environment includes the steps of receiving from a server a response to a request, the request having been sent by at least one client to the server; determining at least one directive statement from the response; and executing the at least one directive statement to convert the response from a first representation thereof to a second representation thereof. In one embodiment, the step of receiving a response occurs substantially concurrently with the step of determining at least one directive statement.

An exemplary computer program product for converting data from a first representation to a second representation in a network environment, includes a computer readable storage medium and a computer program mechanism embedded therein. The computer program mechanism includes logic code for receiving from a server a response to a request, the request having been sent by at least one client to the server; logic code for retrieving a representation conversion program, the representation conversion program having been specified in the response; and logic code for applying the representation conversion program to convert the response from a first representation thereof to a second representation thereof. In one embodiment, the computer program product also includes logic code for sending the converted response to at least one client. In an exemplary embodiment, the logic code for receiving a response is executed substantially concurrently with the logic code for retrieving a representation conversion program. In an exemplary embodiment, the representation conversion program is specified in a header portion of the response from the server. In another exemplary embodiment, the logic code for retrieving a representation conversion program includes logic code for retrieving the program from a local cache in a proxy server or a client computer. In another exemplary embodiment, the logic code for retrieving a representation conversion program includes logic code for downloading the specified program from a location remote from a proxy server or a client computer. The representation conversion program includes an applet written in the Java language, a program written in the TCL language and programs written in other suitable languages. In a preferred embodiment, the second representation requires less network bandwidth to transfer within the network environment than the first representation. In another preferred embodiment, the second representation has a format more suitable for use by the client computer than the first representation.

Another exemplary computer program product for converting data from a first representation to a second representation in a network environment includes logic code for receiving a request from at least one client; logic code for specifying a representation conversion program in a response to the request; and logic code for sending the response to a destination. The specified representation conversion program can be used by a computer at the destination to convert the response from a first representation thereof to a second representation thereof. In an exemplary embodiment, the response includes data having an associated content type. In this embodiment, the logic code for specifying a representation conversion program includes logic code for selecting one of a set of representation conversion programs based on the content type.

Yet another exemplary computer program product for converting data from a first representation to a second representation in a network environment includes logic code for receiving a request from at least one client; logic code for specifying at least one directive statement in a response to the request; and logic code for sending the response to a destination. The response can be converted by a computer at the destination from a first representation thereof to a second representation thereof in accordance with the at least one directive statement.

Another exemplary computer program product for converting data from a first representation to a second representation in a network environment includes logic code for receiving a response to a request from a server, the request having been sent by at least one client to the server; logic code for determining at least one directive statement from the response; and logic code for executing the at least one directive statement to convert the response from a first representation thereof to a second representation thereof. In an exemplary embodiment, the logic code for receiving a response is executed substantially concurrently with the logic code for determining at least one directive statement from the response.

In an exemplary embodiment, a proxy server or a client may apply the retrieved representation conversion program to its associated response as well as to other responses. For this reason the program is preferably saved in a cache for future access. Saving the program in a cache improves efficiency by minimizing future retrieval time. In another exemplary embodiment, each response can be saved in a response cache.

One objective of this invention is to provide, with minimal overhead, methods and computer program products that obtain and apply specific advice and instructions from a server to convert the representation of a specific response from a first representation to a second representation, where the second representation is more efficient to transfer to and/or more suitable to display at a client computer. This invention optimizes efficiency and convenience without creating undue harm to the utility and aesthetic properties of the content.

DETAILED DESCRIPTION OF PREFERRED EMBODIMENTS

Figure 1:
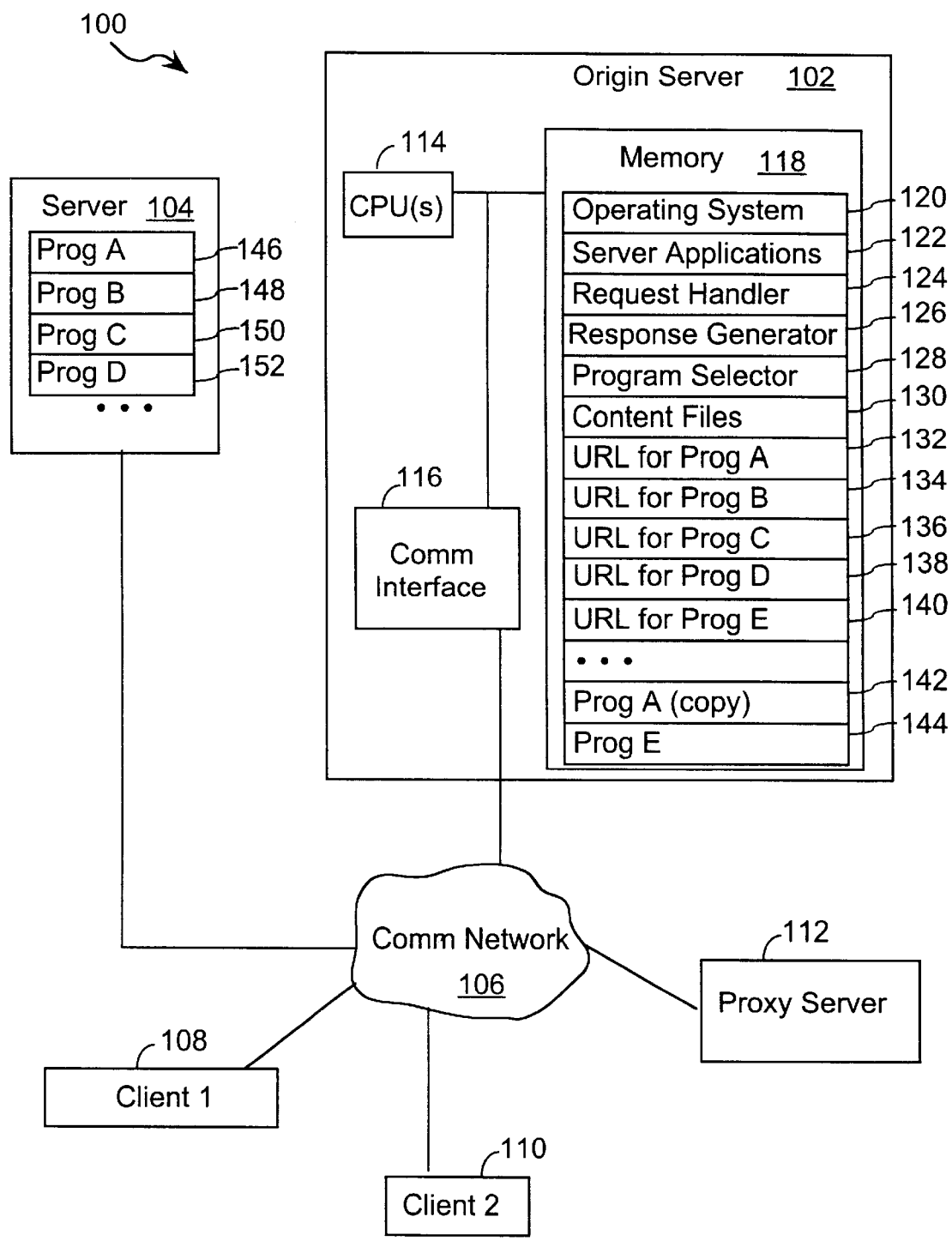
FIG. 1 is a block diagram illustrating a network system in accordance with an embodiment of the invention.

FIG. 1 is a network system 100 in accordance with an embodiment of the present invention. The system 100 includes an origin server 102, another server 104, a client 108, another client 110, a proxy server 112, and a communications network 106. The servers 102104, clients 108–110 and the proxy server 112 are connected to each other through the communications network 106. In a preferred embodiment, the communications network 106 is the Internet. The origin server 102 includes one or more central processing units (CPU's) 114, a communication interface 116, which provides the interface between the origin server 102 and the communication network 106, and a memory 118. The memory 118 includes:

an operating system 120;

server applications 122;

a request handler 124 for handling client requests;

a response generator 126 for generating responses to client requests;

a program selector 128 for selecting programs to be specified in responses; and content files 130.

The memory 118 also includes a library or URLs. The library specifies the locations of representation conversion programs which are not stored in the memory 118, designated in FIG. 1 as URL for Prog A 132, URL for Prog B 134, and so on through URL for Prog E 140. In addition, the memory 118 includes locally stored representation conversion programs, designated as Prog A 142, and Prog E 144.

The request handler 124 parses requests received from clients. Based on each parsed request, the response generator 126 creates a response. In an exemplary embodiment, the generated response, in addition to response data, specifies a representation conversion program which can be used by the client 108 or the proxy server 112 to convert the response from one representation to another representation. The program selector 128 selects an appropriate representation conversion program for each response. The selected representation conversion program may be stored at the origin server 102 or stored remotely. Regardless of whether the program is stored remotely or in the origin server, a URL for the program, chosen from the set of program URLs 132–140, can be specified in the response. It should be noted that some representation conversion programs (e.g., Prog A 142, 146) may be stored on multiple servers, in which case the program URL (e.g., URL for Prog A 132) may point to any of the copies of the program or, alternately, there may be multiple program URLs associated with a particular representation conversion program.

In an alternate embodiment, in situations in which the selected program is unusually small, or small compared to the size of the response, the server may send the program with the response instead of the program's URL.

The server 104 represents other servers connected on the network 106. The server 104 includes representation conversion programs Prog D 146, Prog E 148, Prog F 150, Prog G 152 and so forth.

Clients 108 and 110 are representative clients connected to the network 106. Clients connected to the network 106 have different capabilities. For example, some clients may have more computing capabilities than other clients; display capabilities will also vary from client to client. Examples of clients are illustrated in FIGS. 2 and 3.

Figure 2:
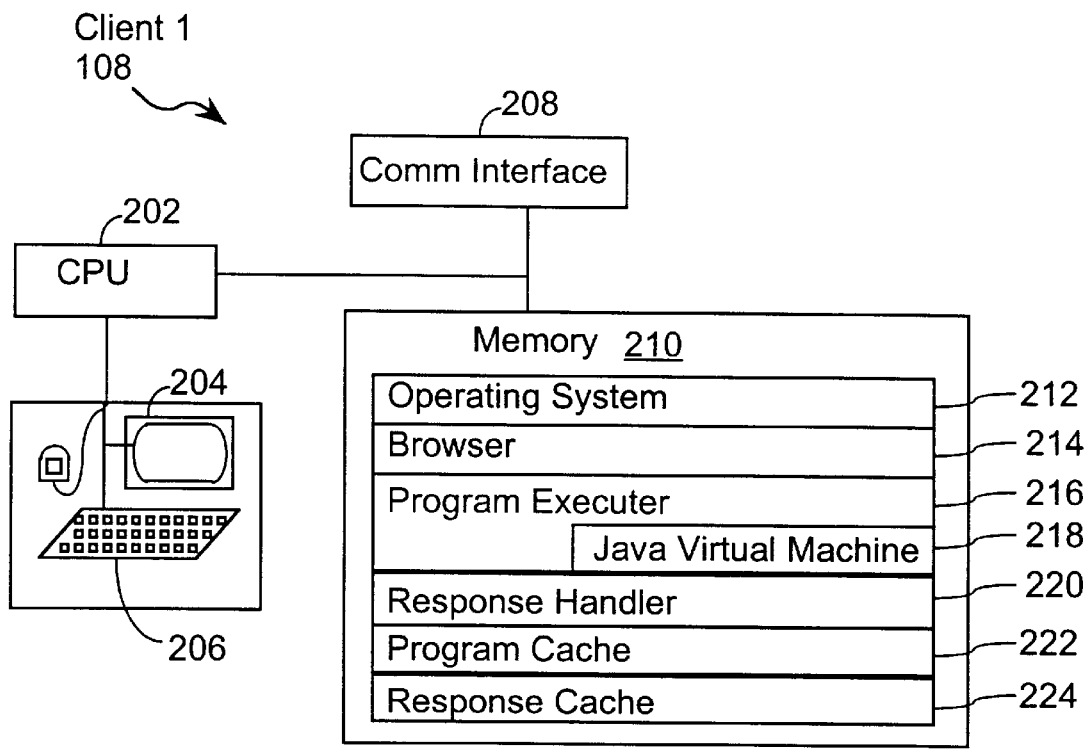
FIG. 2 is a block diagram illustrating an exemplary client in accordance with an embodiment of the present invention.

FIG. 2 is a block diagram illustrating exemplary client 108. The client 108 includes a CPU 202, a display device 204, an input device 206, a communication interface 208 and memory 210. The memory 210 includes an operating system 212, a browser 214, a program executer 216, such as a Java Virtual Machine 218, a response handler 220, a program cache 222, and a response cache 224.

The client 108 communicates to other systems on the network 106 (FIG. 1) through the communication interface 208. In an exemplary embodiment, the client 108 utilizes a browser program 214 to send and receive information from other systems on the network 106. When the client 108 receives a response from the origin server 102 (FIG. 1), the response handler 220 parses the response. In an exemplary embodiment, the response handler 220 identifies from the response a representation conversion program which can be used to convert the response from one representation to another representation. If the representation conversion program is already stored in the program cache 222, the client 108 can execute the program to modify the representation of the response by using the program executer 216. If the representation conversion program is not in the program cache 222, the client 108 can retrieve the program from remote locations on the network 106. In an exemplary embodiment, any retrieved program is saved in the program cache 222. The response can also be stored in the response cache 224 for faster future access. The client 108 determines whether to execute the representation conversion program depending on various factors, such as the client's own display capabilities.

Figure 3:
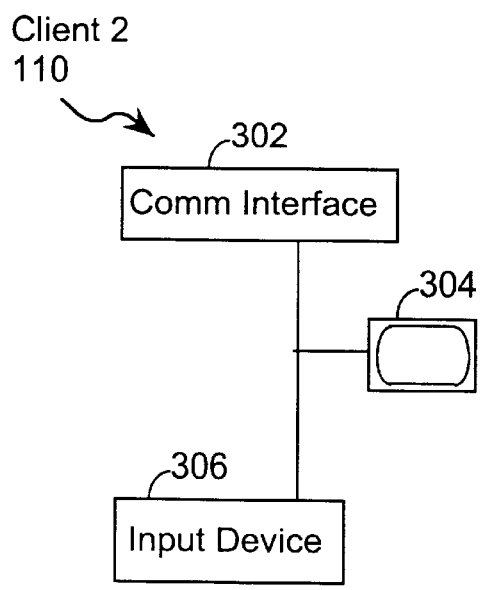
FIG. 3 is a block diagram illustrating an exemplary client in accordance with an embodiment of the present invention.

FIG. 3 is a block diagram illustrating another exemplary client 110. The client 110 includes a communications interface 302, a display device 304 and an input device 306. This exemplary client 110 has minimal computational capability. To reduce the computational burden on such client 110, the client 110 typically relies on the proxy server 112 (FIG. 1) to act as an intermediary between it and servers on the network 106. If the proxy server 112 is used, the proxy server 112 receives responses from the origin server 102, converts the responses to a representation suitable for display at the client's display device 304, and transfers the converted response to the client 110. Even clients having strong computational capabilities may be configured to received information from information servers via proxy servers for a variety of reasons (e.g., to heighten security).

Figure 4:
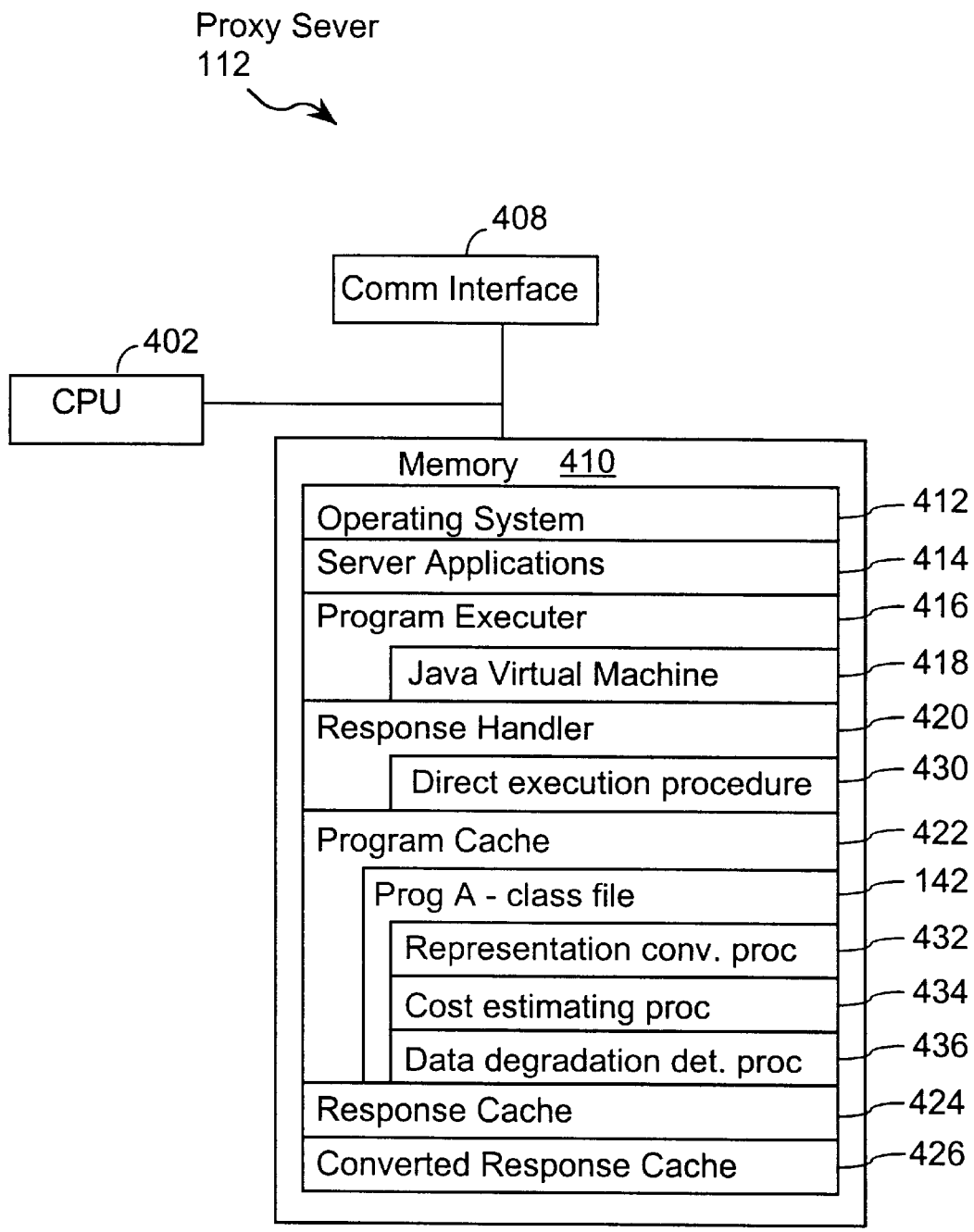
FIG. 4 is a block diagram illustrating an exemplary proxy server in accordance with an embodiment of the present invention.

FIG. 4 is a block diagram illustrating an exemplary proxy server 112. The proxy server 112 includes one or more central processing units (CPU's) 402, one or more communications interfaces 408 and memory 410. The memory 410 includes an operating system 412, server applications 414, a program executer 416, such as a Java Virtual Machine 418, a response handler 420, a program cache 422, a response cache 424 and a converted response cache 426. In an exemplary embodiment, the proxy server 112 receives a response from the origin server 102 and uses the response handler 420 to parse the response. The response handler 420 identifies from the response a representation conversion program that can be applied to convert the response from one representation to another representation. If the representation conversion program is already stored in the program cache 422, the proxy server 112 can execute the program to modify the representation of the response by using the program executor 416. The proxy server 112 determines whether to apply the representation conversion program based on various factors, such as its knowledge about the client's capabilities, data transfer efficiency between the proxy server 112 and the client, undesirable quality loss after conversion, available bandwidth, and client's preference for high-resolution images. If the program specified in the response is not in the program cache 422, the proxy server 112 can retrieve the program from remote locations on the network 106. In an exemplary embodiment, any retrieved program is saved in the program cache 422. The response, whether converted or unconverted can be stored in the response caches 424, 426, respectively. If the proxy server 112 converts a response from one representation to another representation, the proxy server 112 transfers the converted response to the client to be displayed at the client's display device. In an exemplary embodiment, if the proxy server 112 decides to not convert a response, the unconverted response is sent to the client to be displayed at the client's display device.

In some situations, the proxy server 112, by applying a predefined set of rules, may determine that the client device is unable to display the response (or is unable to display a meaningful representation of the response), or that the amount of time required to transmit the response is unacceptably long, or that the response is unacceptable to the client device for any of a number of other reasons. In such situations the proxy server replaces the response with a suitable error or warning message (e.g., "unable to format response for display on this device," or "error code AB-123" ) that is then sent to the client.

Figure 5:
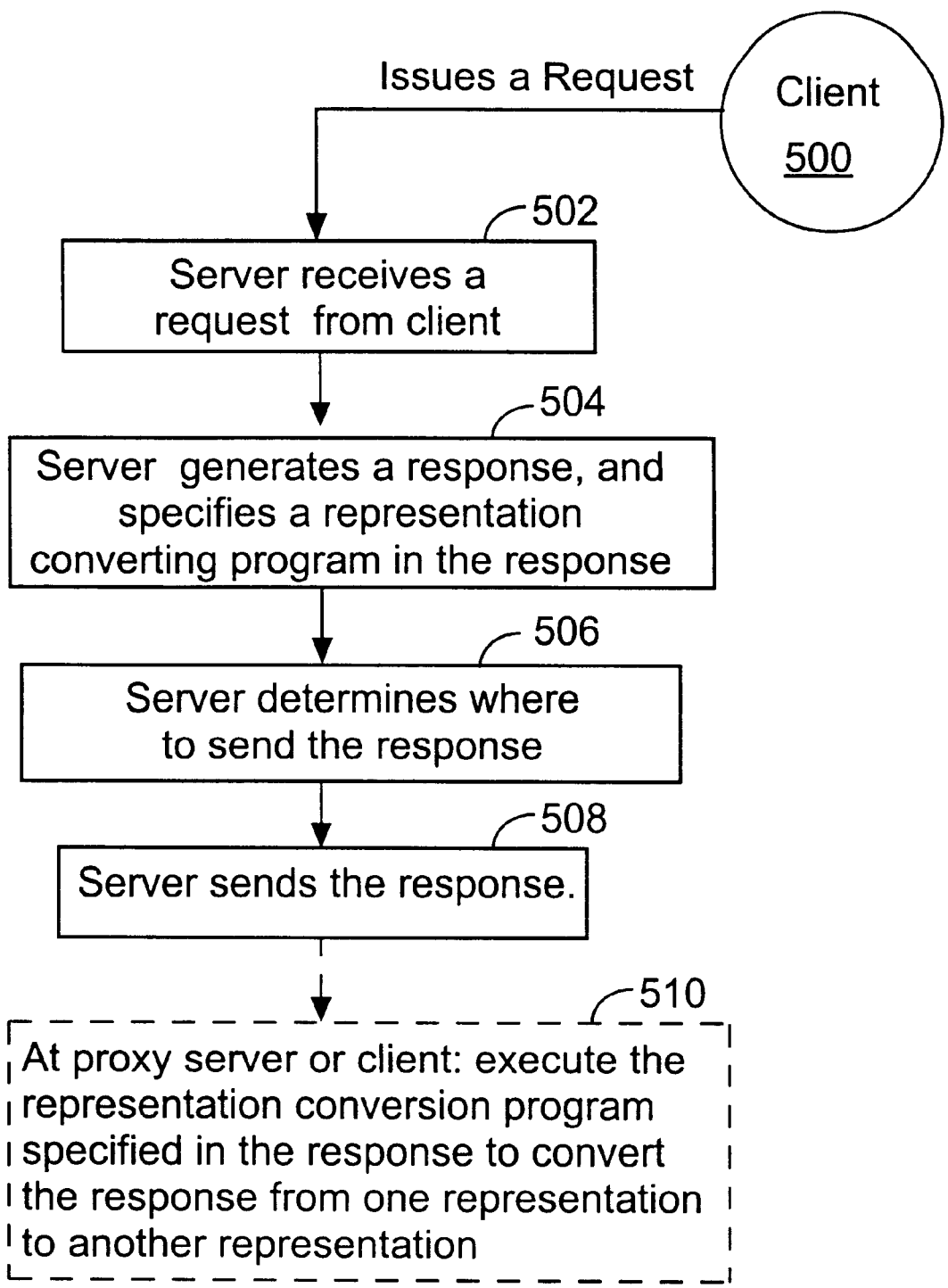
FIG. 5 is a flow chart of a server process in accordance with one embodiment of the present invention.

FIG. 5 illustrates an exemplary process of the present invention. A client 500 issues a request. A server receives the request (502). The server generates a response, and also specifies a representation conversion program in the response (504). The server determines where to send the response (506). For example, the server may send the response to the client 500 directly or it may send the response to a proxy server that acts as an intermediary between the server and the client 500. After the server determines where to send the response, the response is sent (508). At the proxy server or client, depending on where the server sent the response, the representation conversion program specified in the response is optionally executed (510) to convert the response from one representation to another representation that is more suitable for display at the client 500.

Figure 6:
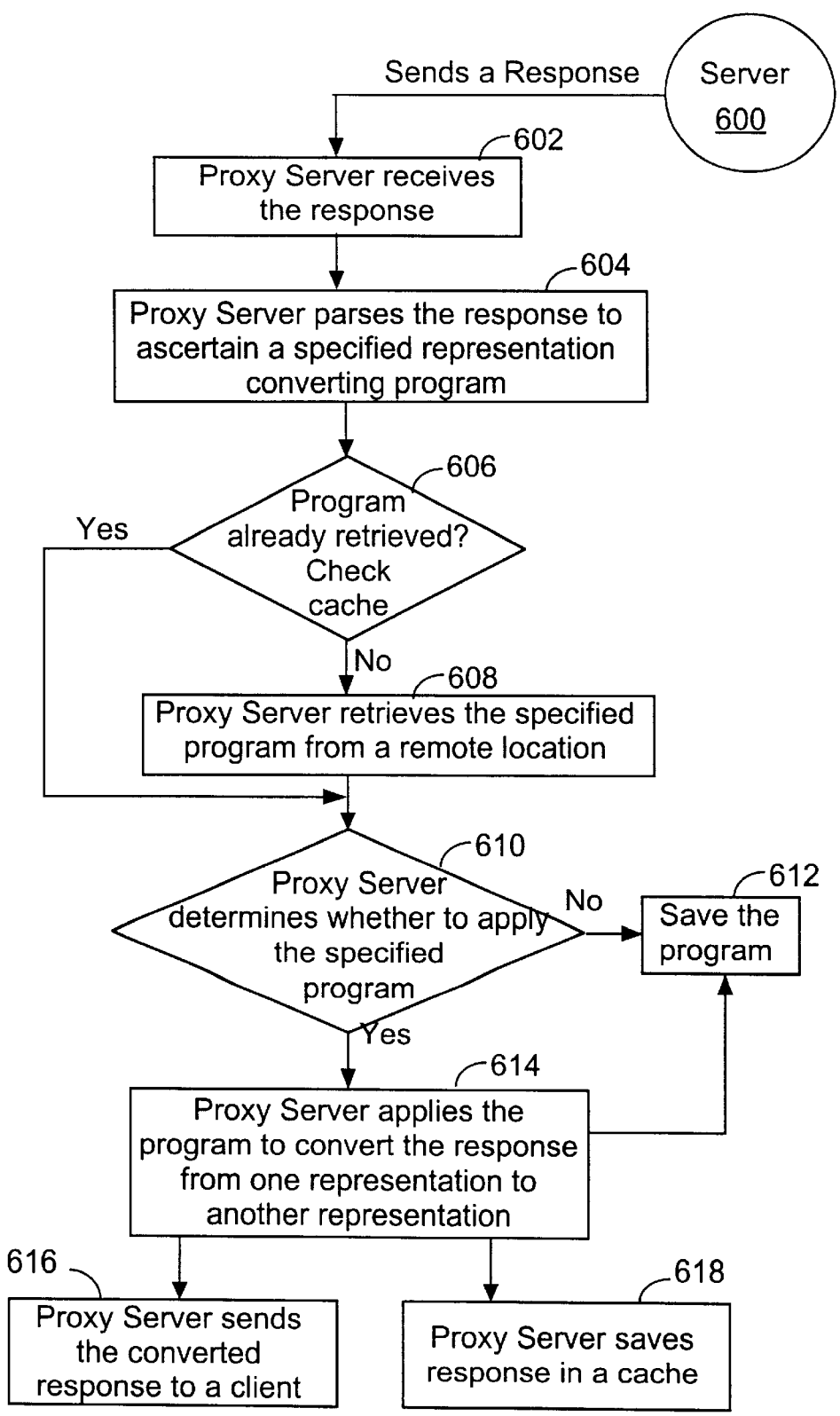
FIG. 6 is a flow chart of a proxy server process in accordance with an embodiment of the present invention.

FIG. 6 illustrates an exemplary process performed by a proxy server in a preferred embodiment of the present invention. A server 600 sends a response (to a client query)

that is received by a proxy server (602). The proxy server parses the response to ascertain what representation conversion program, if any, is specified by the response (604). The proxy server checks its cache to determine if the program is already in the cache (606). If the program is found in the cache, step 608 is skipped. If the program is not found in the cache, the proxy server retrieves the specified program through the network 106 (608). Typically, the proxy server determines whether to apply the specified program based on its knowledge of the client's capabilities and network transfer efficiency (610). For instance, if the representation conversion program includes a procedure (e.g., procedure 434 shown in FIG. 4) for making this determination, the procedure for making this determination is executed.

In a preferred embodiment, regardless of whether the proxy server decides to apply the program, the program is saved in a cache for faster future access (612). If the proxy server decides to apply the program, the specified representation conversion program is executed so as to convert the response from one representation to another representation that is more efficient for transferring to and more suitable for displaying at the client computer (614). When the representation conversion program includes a procedure (e.g., procedure 436 shown in FIG. 4) for determining which of a range of representation conversions to perform, that procedure is executed so as to determine one or more conversion control parameter values that are then used by the main representation conversion procedure (e.g., procedure 432 shown in FIG. 4) to control the actual representation conversion process.

After the response has been converted, the proxy server sends the converted response to the client for display (616). The proxy server can save the response, whether converted or unconverted, in respective response caches (618).

Figure 7:
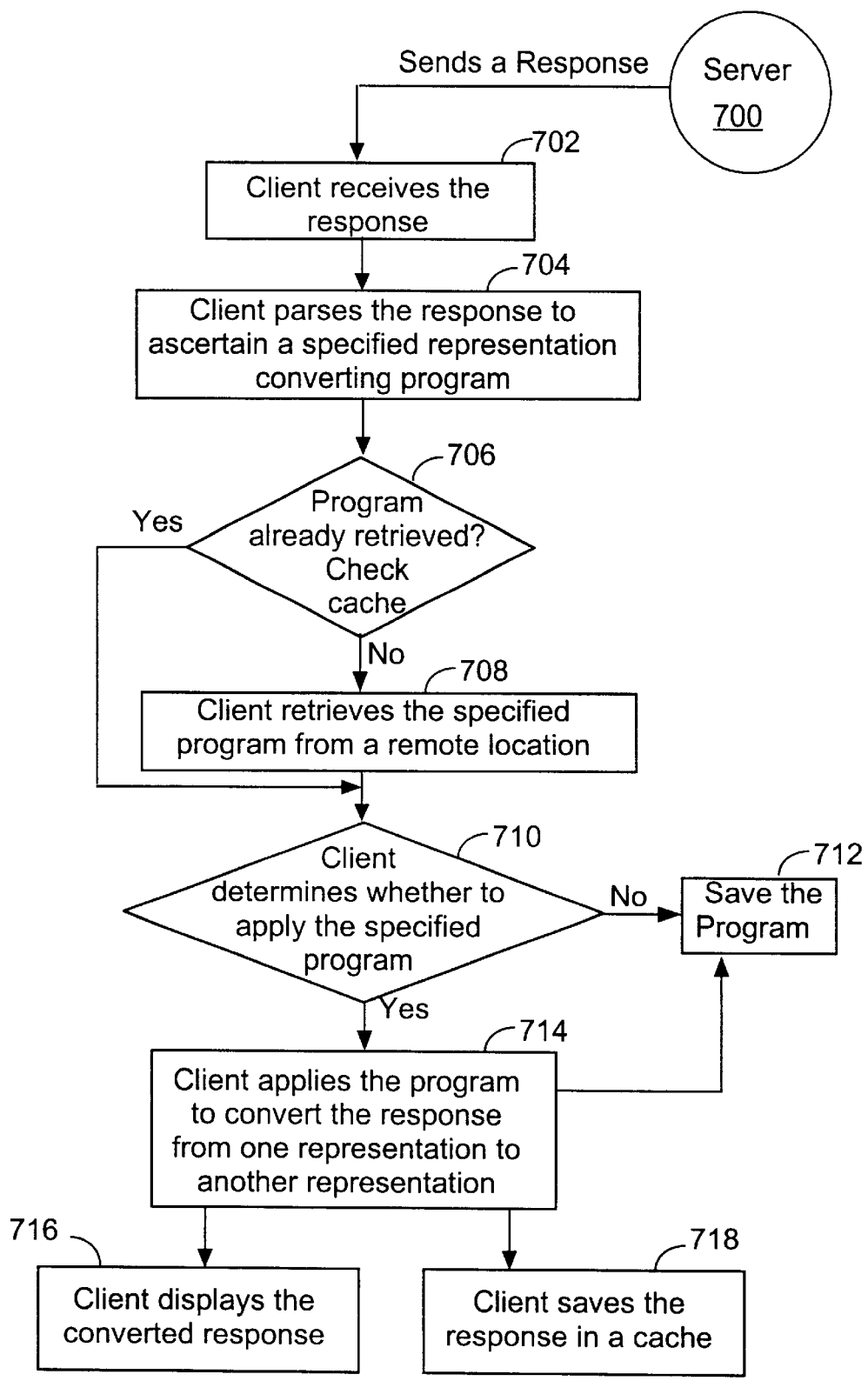
FIG. 7 is a flow chart of a client process in accordance with an embodiment of the present invention.

FIG. 7 illustrates an exemplary process performed by a client device in a preferred embodiment of the present invention. In response to a client request or query (not shown), a server 700 sends a response that is received by the client device (702). The client device parses the response to ascertain what representation conversion program, if any, is specified by the response (704). The client checks its program cache to determine if the program is already in the cache (706). If the program is found in the cache, step 708 is skipped. If the program is not found in the cache, the client retrieves the specified program through the network 106 (708). Next, the client determines whether to apply the specified program based on its own display capabilities (710). For instance, if the representation conversion program includes a procedure (e.g., procedure 434 shown in FIG. 4) for making this determination, the procedure for making this determination is executed.

In a preferred embodiment, regardless of whether the client decides to apply the program, the program is saved in a cache for faster future access (712). If the client decides to apply the program, the specified representation conversion program is executed so as to convert the response from one representation to another representation that is more suitable for its display capabilities (714). When the representation conversion program includes a procedure (e.g., procedure 436 shown in FIG. 4) for determining which of a range of representation conversions to perform, that procedure is executed so as to determine one or more parameter values that are then used by the main representation conversion procedure (e.g., procedure 432 shown in FIG. 4) to control the actual representation conversion process.

After the response has been converted, the client device displays the converted response on a display device (716). When the client device has sufficient cache memory to cache responses from the server 700, its save the response in a response cache for faster future access (718).

General Operation

A client's request to a server may be sent directly to the server or through one or more intermediaries, collectively called a proxy server. Likewise, a server may send a response to a client directly or through a proxy server. For simplicity in describing the various embodiments of the present invention, "proxy" will be used throughout to represent either a proxy server or a client. However, the exemplary embodiments are not limited to systems which utilize proxy servers.

In an exemplary embodiment, a HTTP response from a server may include an image in a GIF format and the following header lines:

HTTP/1.0 200 OK

Date: Tue, 04 May 1999 22:51:34 GMT

Last-Modified: Tue, 04 May 1999 22:51:30 GMT

Content-type: image/gif

Content-Length: 59744

Based on the information in the header lines, a proxy knows that the response contains an image in GIF format (from the Content-type header) and that the image's length is 59744 bytes. If the proxy's connection bandwidth is 14,400 bits/second, the proxy could predict that the image requires approximately 33 seconds to be transmitted.

The HTTP/1.0 protocol allows an origin server to add another header line, such as a "cache-control:" header line. This header line provides additional information to the proxy regarding the body of the response. For example, a header line that reads "Cache-control: no-transform" would inform a proxy that it's not safe to convert the image at all. In the absence of such a header line, the proxy can assume that the representation of the image may be converted.

The proxy generally does not have knowledge regarding: (a) the amount of information that can be removed from a response image without making the image useless; (b) what information can be removed without rendering an image useless; (c) the size of the resulting converted image; and (d) the time required to perform the conversion.

In an exemplary embodiment, the origin server 102 (FIG. 1), when sending a response using a protocol such as HTTP, attaches information to the response describing how to convert the body portion of the response and how the conversion will affect the size and utility of the response. For example, the response may include one or more directive statements that may be executed using a directive execution procedure 430 that constitutes one of the proxy's standard programs. The directive statements may include conversion parameters that specify the type of representation conversion to be performed. To illustrate, a response header may be as follows:

HTTP/1.0 200 OK

Date: Tue, 04 May 1999 22:51:34 GMT

Last-Modified: Tue, 04 May 1999 22:51:30 GMT

Content-type: image/gif

Content-Length: 59744

Transcode-Info: convertible-to=image/jpeg, min-jpeq-quality=55, min-jpeg-size=27966

In this exemplary embodiment, the origin server 102 essentially instructs the proxy that it is possible to convert this GIF-format image to a JPEG-format image, that the lowest allowable JPEG quality factor (a measure of the amount of information loss) is 55%, and that at the indicated quality level, the resulting size is 27966 bytes. In this embodiment, the proxy could use various predefined policies to decide whether to convert the image. These policies may be based on factors such as computation time, device display capabilities, and the like. For instance, the proxy may predict, using the min-jpeg-size information, that at minimum quality the image would take about 15.5 seconds to transmit over a 14,400 bit/sec connection. If the conversion is being performed not at a proxy but at the ultimate recipient client, the client need not consider post-conversion transmission efficiency. The directive statements as provided in the Transcode-Info header line can be provided in a variety of syntax and preferably using standardized formats. In an exemplary embodiment, directive statements can provide detailed instructions specifying portions of a complex image, for instance important "foreground" portions that should not be accidentally reduced. Other "background" portions of the image, which can be safely reduced or eliminated, may be specified to the directive statement procedure 430 by explicit directive statements, or may be indirectly indicated by not being specified as "foreground" portions.

There are some possible disadvantages to using directive statements. One disadvantage is that directive statements should be standardized for interoperability in a multi-vendor network. Standardization requires time and cooperation. Another disadvantage is that generation of directive statements by the origin server 102 and processing of directive statements at the proxy may be slow, complex, and unreliable. In addition, some representation conversions cannot be easily described using declarative statements. For example, the figure and ground colors in an original image may vary in different regions of a particular image, thus requiring an extremely detailed description of the boundaries of these regions.

In many instances, it may be preferable to provide procedural rather than directive statements about representation conversion. In an exemplary embodiment, the origin server 102 can specify a representation conversion program specific to a content instance in a response. This representation conversion program can be invoked by a proxy to convert the associated response from one representation to another representation, depending on client display capabilities and transfer efficiencies across the network 106.

The representation conversion program may be thought of as a filter which takes one input (the original content) and produces one output (the converted content). The conversion program can apply a number of parameters, allowing the proxy to control the tradeoff between efficiency and degradation. Because the conversion program typically does not come into contact with data not included in its associated response, the program should not be a security risk when properly firewalled from other proxy components. In an exemplary embodiment, languages such as Java (a trademark of Sun Microsystems, Inc.) or TCL can be used to create the programs. It is well known in the art how to firewall (or "sandbox") Java and TCL programs from other system components.

Representation conversion programs created using either the Java or TCL languages are generally lengthy; thus, preferably, the origin server 102 should not automatically send the entire program as part of the server response. Particularly, if the proxy later decides not to use the program, automatic transmission of the program would be a waste of network bandwidth.

In an exemplary embodiment, the proxy has a cache where each retrieved representation conversion program is stored for future use. In this embodiment, when the proxy receives a response specifying a representation conversion program from an origin server 102, the proxy checks its cache before attempting to retrieve the program from elsewhere. Saving programs in a cache reduces time spent downloading programs and increases efficiency. Although representation conversion programs are in principle instance-specific, in practice, a given program is likely to be applicable for many content instances.

In an exemplary embodiment, a response can include a reference to a representation conversion program via a Universal Resource Locator (URL) or Universal Resource Name (URN). A URL identifies a resource at a specific location, whereas a URN identifies a resource which can be located at multiple locations. In the context of the example used earlier, a response which specifies a representation conversion program might be sent with these header lines:

HTTP/1.0 200 OK
Date: Tue, 04 May 1999 22:51:34 GMT
Last-Modified: Tue, 04 May 1999 22:51:30 GMT
Content-type: image/gif
Content-Length: 59744
Transcode-Info: app="http://applets.compaq.com/applet37.cls"

The header line beginning with "Transcode-Info:" provides a URL for an "applet" (small Java application program) which may be used to convert the representation of this image response. In one embodiment, the Transcode-Info header could convey a location-independent name (i.e., URN) for the applet using a message-digest value (i.e., an MD5 checksum) of the applet. Each digest value is considered essentially unique. Generation and security of a MD5 checksum of a particular resource on the Internet are described in the following article which is hereby incorporated by reference as background information: The HTTP Distribution and Replication Protocol, Arthur van Hoff, John Giannandrea, Mark Hapner, Steve Carter, Milo Medin, Aug. 25, 1997. This article is downloadable at this web site: http://www.w3.org/TR/NOTE-drp.

Using digest value avoids confusion and/or downloading of the same resource twice. If a resource is stored at several locations (i.e., under several URLs), assigning a digest value to the resource prevents downloading the same resource multiple times (i.e., once per URL). For example, a digest value could be included in the header portion of a response:

HTTP/1.0 200 OK
Date: Tue, 04 May 1999 22:51:34 GMT
Last-Modified: Tue, 04 May 1999 22:51:30 GMT
Content-type: image/gif
Content-Length: 59744
Transcode-Info: app="http://applets.compaq.com/applet37.cls",
app-digest="md5: FNG4c6MJLdDEY1rcoGb4pQ=="

In the above example, both the URL and the digest value for the applet are provided in the server response. In an exemplary embodiment, the proxy can use the HTTP (or similar) protocol to retrieve the resource (or applet) associated with the URL or digest value. Because a given applet may be useful for many different response instances, the proxy should preferably save any retrieved applet in its cache. The applet stored in the proxy's cache typically has a different URL than the same applet stored at another location on the network 106. In this case, the digest value of the applet could be used to avoid superfluous future retrievals.

Typically, a server response contains at least two parts: (1) a header portion and (2) a body portion containing data. Because the proxy receives the applet URL as part of the header information before receiving the bulk of the data, it could in principle initiate the retrieval of the applet in parallel with the continued retrieval of the data in the response. The retrieval of the applet and the data portion of the response does not have to be serialized. Parallel retrieval of the representation conversion applet and the response body helps to reduce latency when the applet is not already cached. Once the proxy has received both the data and the representation conversion applet, it can use an estimation method to decide whether to proceed with conversion. For example, it is well-known in the art that it is not always beneficial to convert a data instance from a loss-free image format such as GIF to a lossy format such as JPEG, especially for small or very simple images. If the estimated benefits are acceptable (i.e., the estimated conversion CPU time does not add much latency or consume excessive resources), the proxy may then invoke the applet to convert the data instance.

In an exemplary embodiment, a representation conversion program could be a "class" containing several methods. For example, referring to FIG. 4, the class for a particular representation conversion program, Prog A 142, may preferably include (a) a method 432 to perform the representation conversion operation taking as input the original data instance, and producing as output a converted data instance; this method may take, as a parameter, a specification of target characteristics and goals, including network transmission speed, client's display capabilities, and so on; (b) a method 434 to estimate cost, in terms of CPU time and memory, to convert a response based on a set of specifications and the effect of the conversion (e.g., the size and quality of the output); and (c) a method 436 that calculates the maximum allowable degradation that would still yield useful results. With regard to the third method 436, for a given response data body and conversion program, the proxy or client might still have a range of possible choices for how much to degrade the data. For example, for a GIF to JPEG data conversion, for which there is typically a quality factor that controls the quality of the resulting JPEG image, the third method 436 might compute for the proxy or client a minimum allowable quality factor for the specific image to be converted.

The details of the representation conversion applet's parameters are probably best left to an open standards process. The resulting standard should be extensible, so as to allow for the use of conversion in currently unforeseen situations.

The present invention provides efficient methods and systems for proxy servers or clients to obtain instance-appropriate representation conversion instructions. These instructions are best specified as a representation conversion program in an object-oriented programming model, but might also be specified as directive statements.

One major advantage of this invention, with respect to prior approaches, is that the proxy server or client can perform instance-appropriate representation converting operations. The proxy server and the client are not restricted to a limited set of conversion algorithms. Prior approaches cannot adapt to the specific semantic requirements of individual data instances, and thus are forced to tradeoff output quality for conversion effectiveness (e.g., size reduction). In addition, representation conversion at a proxy server or at the client is an improvement over server-based adaptation, because it permits intermediate caching of any unconverted data, reduces burden on the server and network latency. Further, implementation of the present invention involves minimal change to existing standards and systems.

The present invention can be implemented as a computer program product that includes a computer program mechanism embedded in a computer readable storage medium. For instance, the computer program product could contain the program modules shown in the Figures. These program modules may be stored on a CD-ROM, magnetic disk storage product, or any other computer readable data or program storage product. The software modules in the computer program product may also be distributed electronically, via the Internet or otherwise, by transmission of a computer data signal (in which the software modules are embedded) on a carrier wave.

The foregoing examples illustrate certain exemplary embodiments of the invention from which other embodiments, variations, and modifications will be apparent to those skilled in the art. The invention should therefore not be limited to the particular embodiments discussed above, but rather is defined by the following claims.

What is claimed is:

1. A method for converting a response from a first representation to a second representation in a network environment, comprising:

receiving from a server a response to a request, said request heaving been sent by at least one client to said server, said response including a content type specification and a representation conversion specification that is distinct from said content type specification;

based on the representation conversion specification, a client determining whether to convert the response from the first representation to the second representation and, if a determination is made by the client to convert the response to the second representation, retrieving a representation conversion program, the representation conversion program having been specified by said representation conversion specification in said response and applying the representation conversion program to convert said response from the first representation thereof to the second representation thereof.

2. The method of claim 1, further comprising sending said converted response to said at least one client;

wherein the content type specification in the response indicates a content encoding of the response, and the representation conversion specification is a directive to perform a content transformation distinct from said content encoding.

3. The method of claim 1, wherein applying the representation conversion program comprises executing a procedure for determining whether or not to apply the representation conversion program to said response, and applying the representation conversion program to said response only when the procedure generates a positive response.

4. The method of claim 1, wherein the representation conversion program includes a first subprocedure for determining whether or not to apply the representation conversion program to said response; and applying the representation conversion program comprises executing the subprocedure to determine whether or not to apply the representation conversion program to said response.

5. The method of claim 1, wherein applying the representation conversion program comprises executing a procedure for determining one or more conversion control parameters that correspond to a maximum acceptable amount of data degradation to be caused by applying the representation conversion program to said response, and applying the representation conversion program to said response using the determined one or more conversion control parameters.

6. The method of claim 1, wherein the representation conversion program includes a subprocedure for determining one or more conversion control parameters that correspond to a maximum acceptable amount of data degradation to be caused by applying the representation conversion program to said response; and applying the representation conversion program comprises applying the representation conversion program to said response using the determined one or more conversion control parameters.

7. The method of claim 1, wherein the representation conversion specification is located in a header portion of said response from said server.

8. The method of claim 1, wherein the method is performed by a proxy server.

9. The method of claim 8, wherein retrieving the representation conversion program comprises retrieving said specified program from a local cache in said proxy server.

10. The method of claim 8, wherein retrieving the representation conversion program comprises downloading said specified program from a location remote from said proxy server.

11. The method of claim 1, wherein the method is performed by said at least one client.

12. The method of claim 11, wherein retrieving the representation conversion program comprises retrieving said specified program from a local cache in a client computer.

13. The method of claim 11, wherein retrieving the representation conversion program comprises downloading said specified program from a location remote from a client computer.

14. The method of claim 1, wherein the representation conversion program includes an applet written in a Java language or a TCL language.

15. The method of claim 1, wherein ad second representation requires less network bandwidth to transfer within said network environment than said first representation.

16. The method of claim 1, including saving the representation conversion program in a local cache.

17. The method of claim 1, including saving said response from said server in a local cache.

18. The method of claim 8, including downloading said representation conversion program to said proxy server, from a location remote from said proxy server, in conjunction with receiving said response.

19. The method of claim 1, including downloading said representation conversion program, from a remote location, in conjunction with receiving said response.

* * * * *